May 9, 1933.    J. C. BOGLE ET AL    1,908,494
ELECTRICAL SWITCH AND CONTROL CIRCUIT THEREFOR
Filed Jan. 7, 1927    3 Sheets-Sheet 1
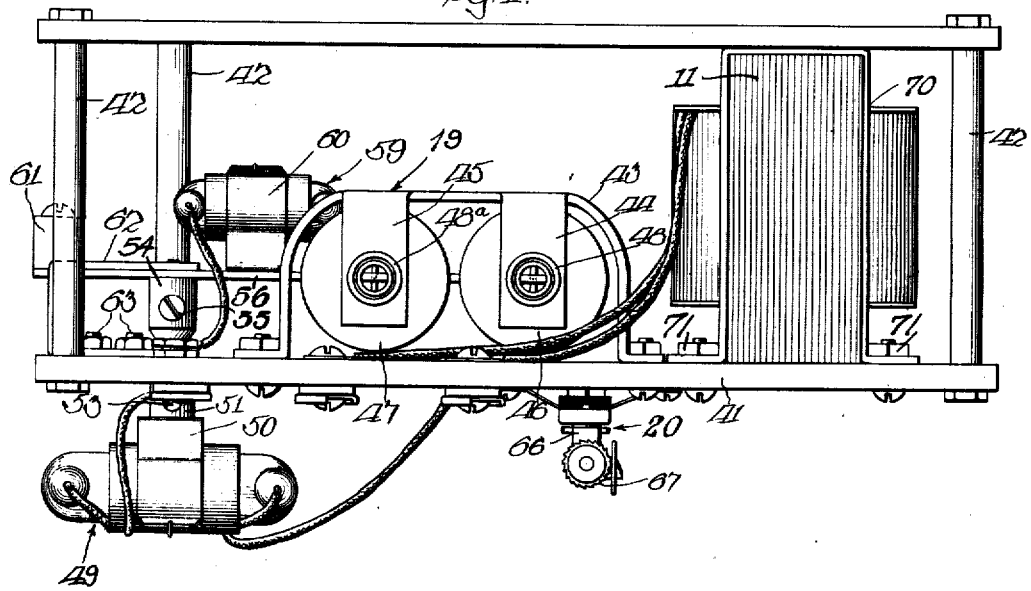
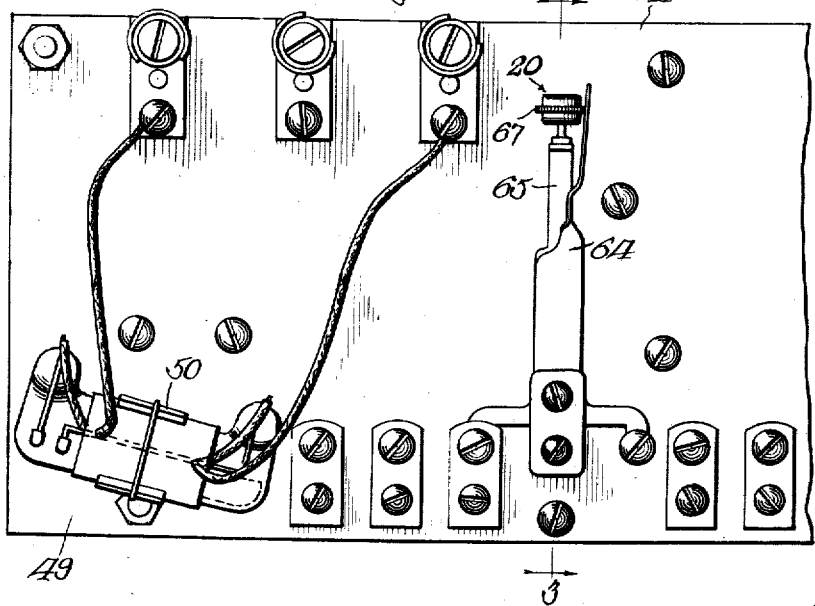
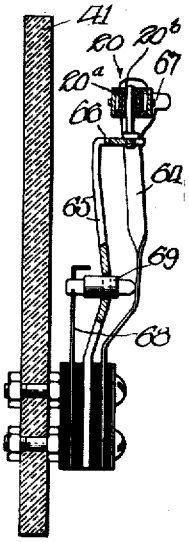
Inventors
JOHN C. BOGLE &
LAWRENCE E. KOCH

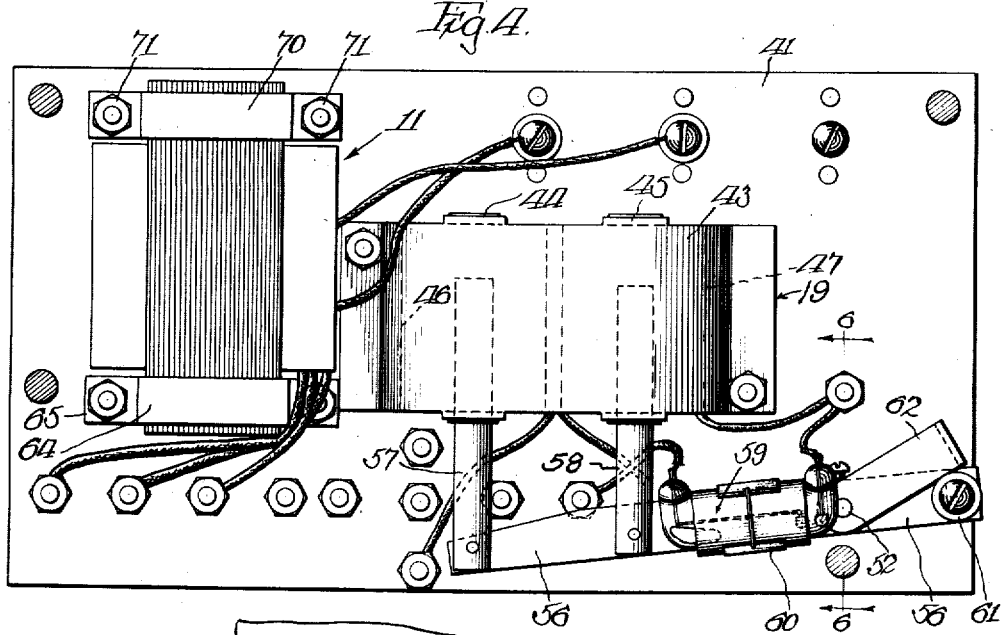

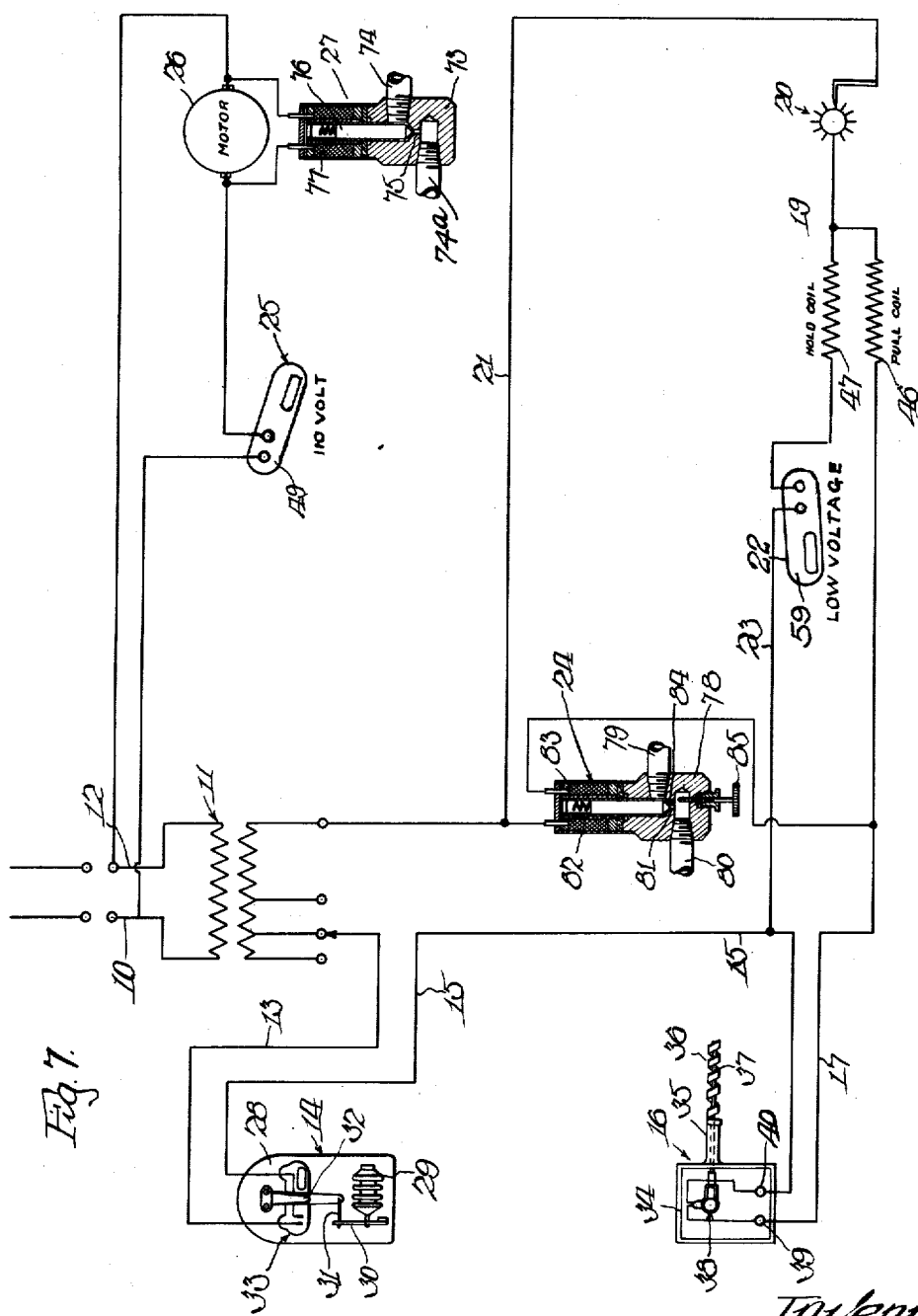

Patented May 9, 1933    1,908,494

UNITED STATES PATENT OFFICE

JOHN C. BOGLE, OF RIVER FOREST, ILLINOIS, AND LAWRENCE E. KOCH, OF ELKHART, INDIANA, ASSIGNORS, BY MESNE ASSIGNMENTS, TO MINNEAPOLIS-HONEYWELL REGULATOR COMPANY, OF MINNEAPOLIS, MINNESOTA, A CORPORATION OF DELAWARE

ELECTRICAL SWITCH AND CONTROL CIRCUIT THEREFOR

Application filed January 7, 1927. Serial No. 159,527.

This invention relates to an electrical switch and has special reference to a safety control and an electrical control circuit in which said safety control is embodied.

More particularly this invention relates to an electrical switch comprising a relay and a time switch for the control of an electrical circuit employing numerous other electrical devices therein. This device is particularly adapted for use in an electrical circuit wherein the control thereof is obtained by low voltage, although it is to be understood that it may also be adapted for use in any electrical circuit. Hereinafter this invention will be described and illustrated in an electrical circuit having a low voltage control circuit for the control of an automatic heating system. Further it is to be understood that this invention is not to be limited in its application to a heating system as it may effectively be employed in any system wherein a number of switches are employed, the present device to act as a safety control to open the circuit in the system and terminate the operation thereof.

Automatic heating systems are equipped with controls responsive to variations of temperature in the room, or other enclosure to be used. For example, such a control may comprise a wall thermostat capable of directing the generation of heat in order that there will be a balance between supply and demand at any and all temperatures without excessive variations in the temperature of the room. For convenience, this switch or control will hereinafter be referred to as a "primary control".

Another form of control for an automatic heating system, although not shown in the drawings, are those for directing the specific limits of temperature or pressure to be obtained by the boiler or furnace. Such instruments may include a water thermostat on a hot water heating boiler, a pressure switch on a steamer vapor boiler or an air switch upon a warm air furnace. Either of these devices may be connected in series with the heretofore mentioned primary control and are to be known hereinafter as "secondary controls."

The present invention comprises a form of control which will be hereinafter referred to as a "safety control." In the event of the failure of the controls previously recited to promote or sustain desirable conditions of combustion within the boiler or furnace when actuated upon by the primary control, (or by both the primary and secondary controls working in collaboration), the safety control shuts down all electrical devices operating to permit fuel to flow and urge combustion. The assembly of the latter electrical devices operating to permit fuel to flow and urge combustion will hereinafter be referred to as the "burner."

Also in automatic heating systems "sequence controls" are employed, which are those involved in the promoting of certain events in a predetermined sequence, as for example, starting the motor, opening the fuel valve and applying ignition means simultaneously. This sequence control is usually actuated by a switch responsive to the heat in the heating system, which latter switch is generally known as a "stack switch" and is shown in the drawings in series with the primary control.

The safety control comprises a pair of switches, one being of high voltage and the other being of low voltage, both of which are mounted on a common axis and angularly disposed relatively to each other and operated by a relay. The relay comprises two coils for the control of a heat coil, the control of said heat coil being obtained by the resistance obtained in both coils of the relay which latter are so adjusted relatively to each other that current flowing through one or the other of said coils in straight series relation will not be sufficient to operate said heat coil, but when both coils are connected in parallel the resistance of the circuit is such that an excessive current flows through said heat coil, thereby causing it to open the circuit after a predetermined interval of time.

The adjustment of the aforementioned current flow through the coils of the relay is controlled by the stack switch. It may now be apparent from the foregoing description that in the event of any irregularities in the system, as evidenced by inordinate flame conditions revealed by the stack switch, the latter will operate to cause current to flow in parallel through both coils of the relay, which will promote an excess flow through the heat coil. After a predetermined interval of time, this excessive flow of current will cause the heat coil to open the circuit and de-energize the coils of the relay, thereby actuating the high and low voltage switches to an open circuit position, which will terminate the operation of the burner.

Summarizing, the main purpose of this invention is to provide a safety control for a system wherein one of the results obtained by said safety control is the control of the electrical devices comprising the sequence controls, the safety control being so designed and so arranged in an electrical control circuit that it also functions in the event of the failure of one of the various electrical devices to function properly to prevent the continuance of burner operation.

Other objects and advantages will be apparent from the description and drawings forming a part of this specification to which latter reference may now be had for a more complete understanding of the characteristic features of this invention, in which drawings:

Figure 1 is a top plan view of the device as embodied in this invention;

Fig. 2 is a front elevational view of Fig. 1;

Fig. 3 is a sectional view taken on the line 3—3 of Fig. 2;

Fig. 4 is a rear elevational view of Fig. 1;

Fig. 5 is a view similar to Fig. 4, showing a changed position of the operating mechanism with parts in section;

Fig. 6 is a detail section taken on the line 6—6 of Fig. 4; and

Fig. 7 is a diagrammatic view of the electrical control of a heating system in which the present invention is embodied.

Referring to the drawings and more particularly to Fig. 7 thereof wherein an electrical control of a heating system is shown, one side of the line 10 is connected to the primary of the low voltage transformer 11 and it returns to the other side of the line 12. One side 13 of the secondary or low voltage side of the transformer 11 is connected to a room switch 14 and thence through line 15 to the stack switch 16. From the stack switch the current passes through line 17 to a coil 46 of the relay 19, thence through the heat coil 20 and back through line 21 to the other side of the secondary of the transformer 11. A low voltage switch 22 is connected to line 15 through line 23, the other terminal of switch 22 being connected to the hold coil 47 of the relay 19 and thence to the heating coil 20. The ignition control means 24 of the heating system is connected between the lines 17 and 21. One side of the high voltage switch 25 is connected to one side of the line 10, the other side of said switch being connected to the motor, the other side of the motor 26 being connected to the line 12. The fuel supply control 27 is connected across the motor.

The various elements of the electrical devices utilized in the control circuit of the heating system have been shown and described in their respective positions in said circuit and now a better disclosure of the devices may be had whereafter their operation in this circuit will be related.

The room thermostatic switch 14, which has been referred to as the primary control, comprises a mounting base 28 of a suitable insulating material on which is mounted an expansible and contractible bellows type thermostatic element 29. This element 29 has a pointed end for engagement with a resilient actuating element 30 which latter occupies a substantially vertical position and is suitably secured at its lower end. The upper end of said actuating member is connected by means of a link 31 to a tiltable holder 32 for a mercury contactor 33. The mercury contactor in this instance comprises a sealed container in which a pair of cooperating electrodes are sealed in one end thereof and in which a body of mercury is disposed for the purpose of bridging the electrodes to establish an electrical circuit through the contactor. The interior of the thermostatic element 29 is provided with a highly volatile fluid which renders the bellows sensitive to the slightest temperature change. In the drawings the contactor occupies an open position or that indicative of the fact that the room is sufficiently warm to have no action on the volatile fluid in the bellows. Should the room cool off, a change in temperature would permit the bellows to contract and to tilt the contactor to a position wherein the mercury would be caused to bridge the electrodes and close the electrical circuit therethrough. This, of course, is but an illustration of an operable device for recording the temperature of a room and various other devices which will obtain similar results may be used.

The thermostatically operated stack switch 16 comprises a casing 34 having a bearing member 35 secured to and projecting therefrom, said bearing to be inserted into a stack of a heating system. A helical bimetallic element 36 is disposed adjacent to the end of the tube 35 and in axial alignment therewith, one end of said element being secured to the bearing 35 and the other end being secured to the rod 37 supported in said bearing 35 and extending therethrough into the casing 34. A mercury contactor 38 is supported in a clip which in turn is in frictional engagement with the rod 37. The contactor 38 comprises a hermetically sealed container having a pair of spaced cooperating electrodes sealed therein, and a body of mercury is also disposed in said container for bridging the spaced electrodes in order to complete an electrical circuit therethrough. One of said electrodes is connected to the terminal 39 and the other of said electrodes is connected to the terminal 40. When in a condition indicative either that there is no combustion in the furnace or boiler or that the combustion is unduly waning the mercury is at the end of the container adjacent the electrodes whereby an electrical circuit is completed therethrough. When combustion does occur within the boiler, the helical element 36 is actuated to turn the rod 37, whereby the contactor 38 is caused to tilt and the mercury caused to flow to the opposite end of the container out of engagement with the electrodes and interrupt the electrical circuit therethrough. This device is described herein merely as illustrative of an operative instrument for recording and directing the specific limits of temperature or pressure to be obtained by a boiler or furnace and may be displaced by various devices obtaining the same result.

The safety control apparatus comprises a supporting plate 41 of an insulating material, which is supported in a casing or other suitable means by rods 42. On the rear side of said supporting plate 41 is mounted a bracket 43 of a substantially U-shape having a pair of bearing members 44 and 45 preferably integral therewith and extending from the sides thereof at right angles thereto. Coils 46 and 47 are disposed between the bearing members 44 and 45, respectively, said coils having central apertures extending therethrough in which are disposed tubular members 48 and 48ª, which engage apertures in the bearing members 44 and 45. The tubular members 48 and 48ª are upset at their ends and thereby held in a fixed relation with said bearing members 44 and 45.

A mercury contactor tube 49 is held in a clip 50 which latter has a collar portion 51 extending therefrom. The collar portion is in turn mounted on a stud shaft 52 journalled in the supporting plate 41, as shown clearly in Fig. 6. The collar portion 51 is rotatably adjustable on shaft 52 and is held in any desired fixed relation therewith by means of set screw 53. On the opposite side of said supporting plate 41 and on shaft 52 is mounted a collar portion 54 also rotatably adjustable on said shaft 52 and held in any desirable position thereon by means of set screw 55. An arm 56 is mounted on the collar 54, said arm 56 extending across the rear side of the supporting plate 41. On one end of arm 56 is pivotally secured a plunger 57 which extends upwardly through the tubular member 48. A second plunger 58 is pivotally secured to the arm 56 and extends upwardly through the tubular member 48ª.

A mercury contactor 59 is mounted in a clip 60 which latter is preferably pivotally secured to the arm 56 at a substantial distance from the shaft 52. The other end of the shaft 56 is provided with a projecting member 61 suitably fixed thereon and which acts as a stop member to limit the downward movement of the plungers 57 and 58. A U-shaped bracket member 62 is fastened to the supporting plate 41 as by means of nuts and bolts 63, one arm of said U-shaped member being adapted to support the end of the stud shaft 52, said arm also being adapted to act as an abutment for the stop member 61.

As is shown more particularly in Fig. 2 of the drawings, the contactor 49 is mounted directly on the shaft 52, while contactor 59 is mounted on an arm 56 which is in turn actuated with the shaft 52 and the contactor 49. It will be noted that the contactors are angularly disposed relative to each other. When the contactors are tilted in one direction, the mercury bridges the electrodes in one of said contactors before it bridges the electrodes in the other of said contactors. Herein we have shown the contactor 59 tilted at a lesser angle of inclination than that of contactor 49 and, therefore, the former completes a circuit therethrough prior to that time at which the circuit is completed through the latter.

The contactors 49 and 59 comprise sealed containers having spaced cooperating electrodes sealed therein adjacent one of their ends and a body of current-conducting fluid for bridging said electrodes to complete an electrical circuit therethrough. These contactors are well known in the art and a further description is believed unnecessary.

The heat coil 20, mounted on the front side of the supporting plate 41, is of the self-soldering type of the general character shown in U. S. Patents No. 817,160 to Cook, dated April 10, 1906 and No. 997,838 to Leeper, dated July 11, 1911. Referring now more particularly to Figs. 2 and 3 a spring conducting support 64 of a common form of construction is shown, which is adapted to coact with a suitable support 65 that, in turn, will be connected with a grounded terminal 68 when the spring member 64 is released, as will be explained. The heat coil 20 is mounted on an extension 66 of the support 65 and has a ratchet member 67 for engaging and holding said spring support 64 in a conducting relation with the support 65 through a heat coil 20b. The grounded spring member 68 is held in disengagement with the support 65 by means of a plunger 69 extending through said support 65 and abutting said spring member 64. When the heat coil 20 is subjected to an excess temperature through the continued flow of an excess current through the resistance winding 20a contained in the coil 20, the fusible material 20b of the self-soldering joint in the heat coil 20 is melted which releases the ratchet 67 and, in turn, releases the tension of the spring member 64. After the tension in the spring member 64 is released, the plunger 69 permits the grounded spring member 68 to engage the support 65 for opening the electrical circuit through the coils 46 and 47 of the relay thereby de-energizing said coils to actuate both high and low voltage switches 49 and 59 to an open circuit position which will terminate the operation of the burner. The mechanism of the heat coil 20 (Patent No. 817,160) and the members 64, 65, 66, 67 and 68 are old in the art (see U. S. Patent No. 1,551,701 to Sands, dated September 1, 1925) and, therefore, a further description is not deemed necessary.

The transformer 11 is shown mounted in suitable brackets 70 fixed to the supporting plate 41 by nuts 71 or other suitable means. All of the essential elements which have just been described as being positioned on the supporting plate 41 are connected in the electrical circuit as heretofore described in Fig. 7. In the operation of the safety control, the switches 49 and 59 are normally open and the coil 46, which will hereinafter be called the "pull" coil, and the coil 47, which will hereinafter be called the "hold" coil, are de-energized having no current flow therethrough. On energization of the pull coil 46, the plunger 57 is drawn upwardly carrying the arm 56 therealong to tilt the switch 59 to a closed circuit position while the switch 49 will still be in open circuit. After the low voltage switch 59 closes, the hold coil 47 will then be energized and the circuit through the switch 49 will be closed, said coil 47 operating to cause the plunger 58 to draw the arm 56 upwardly to tilt the mercury in the high voltage contactor 49 to bridge the electrodes therein.

The remaining electrical devices in the electrical control circuit will now be described whereafter the operation of the safety control will be described in collaboration with all of these electrical devices in the circuit.

The fuel supply control 27, which has been termed hereinbefore a sequence control, comprises a base member 73 which is integrally formed from a block of metal and drilled to provide inlet and outlet ports and valve chambers. The inlet port 74 is formed in one side of the base 73 while the outlet port 74a is formed in the opposite side and below said inlet port. A main port 75 serves to connect the inlet and outlet openings, said port being controlled by the movement of an iron plunger 76 which is vertically reciprocable in a central aperture in an electromagnetic coil 77. In the operation of this fuel supply, the electromagnetic coil is energized, which raises the plunger 76 to control the opening in the main port 75.

The ignition means (another form of sequence control) is controled by a device substantially the same as the fuel supply control 27, and comprises a base member 78 having inlet and outlet ports and valve chambers therein. The inlet port 79 is formed in one side of the base 78, while the outlet port 80 is formed on the opposite side and below said inlet port. A main port 81 serves to connect the inlet and outlet openings, said port being controlled by the movement of plunger 82, which by reason of being acted upon by an electromagnetic coil 83 controls the degree of opening in the main port 81. However, in this construction the inlet and outlet openings are further joined by an auxiliary opening 84 which opening is controlled by a manually operated screw member 85. This device controls a supply of a combustible substance therethrough such as gas for igniting the fuel issuing from said fuel supply control 27. By proper manipulation of the screw member 85, the auxiliary port 84 may be left in such a position that a constant flow of a combustible substance therethrough is eventuated when the main plunger 82 is in a closed position and is for the purpose of maintaining a pilot light which is augmented by a further supply through the main port 81 when the oil burner is in operation.

In the operation of this system, assuming that the temperature of the room is reduced, the room thermostat 14 closes, and current will flow therethrough and through instrument 16, which will be closed because the stack switch is cold, there being no combustion in the furnace. The current then flows through the pull coil 46, the heat coil 20 and back to the other side of the secondary of the transformer. On the energization of the pull coil the plunger 57 is drawn upwardly which action tilts the contactor 59 and causes the circuit to be closed therethrough. Upon the closing of the circuit through the contactor 59, the hold coil 47 will become energized, thereby drawing the plunger 58 upwardly to rotate the shaft 52 and cause the mercury in tube 49 to flow in a direction to bridge the electrodes and establish an electrical circuit therethrough. The closing of the circuit through the contactor 49 connects the motor and fuel supply control 27 in the circuit. Also when current flows through the room switch 14 and stack switch 16, the ignition means 24 will likewise be energized. Therefore, the ignition means for the fuel supply is placed in operative condition simultaneously with the energization of the pull coil.

Assuming that ignition is established, the stack switch 16 after a certain interval of time will move to an open circuit position, and, consequently, the pull coil 46 will be de-energized and all of the current on the low voltage side of the transformer will then be flowing through the room thermostat 14 through contactor 59, hold coil 47, heat coil 20 and back to the secondary of the transformer whereby the normal operation of the system is obtained. The ignition valve 24 will be disconnected with the opening of the switch 16.

If ignition is not established, the stack switch 16 will remain in closed position, and, consequently, current will flow simultaneously through both the pull coil 46 and the hold coil 47, which after a certain predetermined length of time will be sufficient to cause the heat coil 20 to automatically open the circuit. As hereinbefore stated, the heat coil 20 is so designed that when current flows through both the hold coil 47 and the pull coil 46 in parallel, the resistance of the combined circuits thus connected in parallel is of such value that the current flow through the heat coil 20 is sufficient to fuse the fusible material in the heat coil which permits the spring member 64 to open the circuit therethrough. When current flows through the hold coil only the value of this current is such that the heat coil will not open the circuit. In other words, the resistances of the hold coil 47 and the pull coil 46 are so adjusted relatively to each other that current flowing through one or the other of said coils in straight series relation will not be sufficient to operate said coil 20, but when both coils are connected in parallel, the resistance of the circuit is such that an excessive current flows through the heat coil 20 thereby causing it to open the circuit after a predetermined interval of time. Assuming that the heat coil 20 has become opened, it requires manual restoration of the spring member 64 to engage the ratchet member 67 in order to re-establish normal circuit conditions and to cause the oil burner to be in an operative condition.

When both the pull coil and the hold coil are de-energized, which condition is obtained either by the primary control or the heat coil, the plungers 57 and 58 by their own weight drop and move the arm 56 to rotate the shaft 52, thereby causing the mercury in each of tubes 49 and 59 to flow away from their respective electrodes and open the circuits therethrough.

Primary control switch 14 is described more fully in U. S. Patent No. 1,704,370 to Phelan, dated March 5, 1929; thermostatic stack switch or safety control switch 16 is more fully described in copending application, Serial No. 75,895, filed December 17, 1925 by Louis A. M. Phelan and assigned to the assignee of the present application; magnetically operated valve or sequence control 24 and magnetically operated valve or sequence control 27 are fully described in copending application, Serial No. 71,860, filed November 27, 1925. The mercury switches 49 and 59 are fully described in U. S. Patent No. 1,598,874 to Phelan, dated September 7, 1926, and are adapted to be used in high voltage circuits as well as low voltage circuits. A modified form of the mechanism comprising a pull coil, a hold coil, a contactor actuated thereby and a heat responsive element—shown in Figs. 1, 2, 4, 5 and 6, is shown and described in copending application, Serial No. 151,704, filed November 30th, 1926 by John C. Bogle and assigned to the assignee of the present application.

While we have shown a transformer 11 supplying current to the local circuit comprising the switches 14 and 16, the pull coil 18, the hold coil 23, the contactor 59, the valve 24 and the heat coil 20, it is obvious that this transformer 11 can be dispensed with and these instrumentalities can be connected in circuit without feeding current thereto through the medium of the secondary winding of the transformer, as is well known in the art.

While but a single embodiment of this invention has been herein shown and described, it is obvious that various modifications thereof may occur to those skilled in the art without departing from the spirit and scope of this invention, and, therefore, it is desired that the latter be limited only by the scope of the appended claims and the prior art.

We claim:

1. In a device of the class described, a pair of tiltable mercury electric switches mounted on a common axis and angularly disposed relatively to each other, means for tilting said switches into a position whereby a closed circuit is established through one of said switches, and means actuated by said last mentioned switch for tilting the other of said switches into a closed circuit position, each of said mercury electric switches comprising a container, spaced fixed electrodes sealed therein by means of which an external electric circuit is controlled, and a movable body of mercury to make and break the circuit between said electrodes.

2. In a device of the class described, a tiltable mercury electric switch, a shaft on which said switch is fixedly mounted, an arm fixedly mounted on said shaft, a second tiltable mercury electric switch mounted on said arm and angularly disposed relatively to said first mentioned switch, means for tilting said last mentioned switch into a position whereby a closed circuit is established therethrough, and means actuated by said last mentioned switch for tilting the other of said switches into a closed circuit position, each of said mercury electric switches comprising a container, spaced fixed electrodes sealed therein by means of which an external electric circuit is controlled, and a movable body of mercury to make and break the circuit between said electrodes.

3. In a device of the class described, a shaft, a tiltable mercury electric switch adjustably fixed on said shaft, an arm fixedly mounted on said shaft, a tiltable mercury electric switch mounted on said arm and angularly disposed relatively to said first mentioned switch, means for tilting said last mentioned switch into a position whereby a closed circuit is established therethrough, and means actuated by said last mentioned switch for tilting the other of said switches into a closed circuit position, each of said mercury electric switches comprising a container, spaced fixed electrodes sealed therein by means of which an external electric circuit is controlled, and a movable body of mercury to make and break the circuit between said electrodes.

4. In a device of the class described, a tiltable mercury electric switch, a shaft on which said switch is fixedly mounted, an arm adjustably fixed on said shaft, a tiltable mercury electric switch mounted on said arm and angularly disposed relatively to said first mentioned switch, means for tilting said last mentioned switch into a position whereby a closed circuit is established therethrough, and means actuated by said last mentioned switch for tilting the other of said switches into a closed circuit position, each of said mercury electric switches comprising a container, spaced fixed electrodes sealed therein by means of which an external electric circuit is controlled, and a movable body of mercury to make and break the circuit between said electrodes.

5. In a device of the class described, a pair of tiltable switches mounted on a common axis and angularly disposed relatively to each other, and a two-coil relay for operating said switches, one coil of said relay being energized to operate one of said switches into a closed circuit position, said latter switch operating to energize the other of said coils whereby the other of said switches is actuated into a closed circuit position.

6. In a device of the class described, a tiltable mercury electric switch mounted on a shaft, an arm fixed to said shaft a tiltable mercury electric switch mounted on said arm and angularly disposed relatively to said first mentioned switch, a relay for operating said arm whereby said last mentioned switch is tilted into a closed circuit position to effect closing of a circuit through said first mentioned switch, each of said mercury electric switches comprising a container, spaced fixed electrodes sealed therein by means of which an external electric circuit is controlled, and a movable body of mercury to make and break the circuit between said electrodes.

7. In a device of the class described, a pair of tiltable mercury electric switches mounted on a common axis and angularly disposed relatively to each other, and a relay for tilting one of said switches into a closed circuit position to effect closing of a circuit through the other of said switches, each of said mercury electric switches comprising a container, spaced fixed electrodes sealed therein by means of which an external electric circuit is controlled, and a movable body of mercury to make and break the circuit between said electrodes.

8. In a device of the class described, a pair of tiltable switches mounted on a common axis and angularly disposed relatively to each other, a relay comprising a pull coil and a hold coil, said pull coil being adapted when energized to actuate one of said switches into a closed circuit position to energize said hold coil, said hold coil serving to actuate the other of said switches into a closed circuit position, and a switch responsive to the current flow through said relay whereby said relay may be de-energized whereupon said tiltable switches are automatically returned to an open circuit position.

9. In a device of the class described, a pair of tiltable mercury electric switches mounted on a common axis and angularly disposed relatively to each other, a relay for tilting one of said switches into a closed circuit position to effect closing of a circuit through the other of said switches, and a switch responsive to the current flow through said relay whereby said relay may be de-energized whereupon said tiltable switches are returned to an open circuit position, each of said mercury electric switches comprising a container, spaced fixed electrodes sealed therein by means of which an external electric circuit is controlled, and a movable body of mercury to make and break the circuit between said electrodes.

10. In a device of the class described, a pair of tiltable switches mounted on a common axis and angularly disposed relatively to each other, a transformer, one of said tiltable switches being connected to the primary of said transformer and the other of said tiltable switches being connected to the secondary or low voltage side of said transformer, a relay for tilting said low voltage tiltable switch into a closed circuit position to effect closing of a circuit through the other of said tiltable switches, and a switch responsive to the current flow through said relay whereby said relay may be de-energized whereupon both of said tiltable switches are automatically returned to an open circuit position.

11. In a device of the class described, a plurality of tiltable mercury electric switches, means for moving one of said switches to closed circuit position whereby another of said switches may be moved subsequently to closed circuit position, and a resettable heat responsive means to move automatically said switches to open circuit positions, each of said mercury electric switches comprising a container, spaced fixed electrodes sealed therein by means of which an external electric circuit is controlled, and a movable body of mercury to make and break the circuit between said electrodes.

12. In a device of the class described, a plurality of tiltable mercury electric switches, electromagnetic means for moving one of said switches into closed circuit position, a second electromagnetic means thereby energized for moving another of said switches to closed circuit position, and resettable heat responsive means for moving automatically the said switches to open circuit positions, each of said mercury electric switches comprising a container, spaced fixed electrodes sealed therein by means of which an external electric circuit is controlled, and a movable body of mercury to make and break the circuit between said electrodes.

13. In an electric control system for a fuel burning device comprising a stack switch, electrically-controlled means for supplying a fuel mixture the combustion of which influences the operation of said stack switch, a room thermostat which initiates operation of said control system, an electrical safety control mechanism for preventing the operation of said fuel supply means upon said stack switch maintaining its cold position upon initial failure of combustion or returning to cold position upon failure of combustion after initiation, said safety control mechanism having a pair of tiltable switches mounted on a common axis and angularly disposed relatively to each other, means operative by said room thermostat for tilting said switches into a position whereby a closed circuit is established through one of said switches, means operative by said last-mentioned switch for tilting the other of said switches into a closed circuit position whereupon said fuel supply means is energized, and a time-limit device operative to deenergize said safety control mechanism if said stack switch occupies its cold position in excess of a predetermined length of time.

14. In an electric control system for a fuel burning device comprising a combustion-controlled switch, electrical means for supplying a fuel mixture the combustion of which influences the operation of said combustion-controlled switch, ignition means energizable when said combustion-controlled switch is in cold position and deenergized when said combustion-controlled switch is in hot position, a room thermostat which initiates operation of said control system, a safety relay for preventing the operation of said fuel supply means when said combustion-controlled switch maintains its cold position upon initial failure of combustion or returns to cold position upon failure of combustion after initiation, said safety relay when actuated energizing said fuel supply means, and a time-limit device operative to deenergize said safety relay means when said combustion-controlled switch occupies its cold position in excess of a predetermined length of time, said safety relay comprising two tiltable switches mounted in angularly inclined relation to each other for movement about a common axis, means controlled by said room thermostat for operating one of said tiltable switches and means controlled by said one of said tiltable switches for operating the other of said tiltable switches.

15. In a fuel burner control system, in combination, a source of electrical supply, electrically operated means for supplying fuel to the burner, a switch biased to open position and controlling the connection of said electrically operated means to said source, electromagnetic means for controlling the operation of said switch, a main control for effecting initial energization of said electromagnetic means to actuate said switch from open to closed position whereby operation of said electrically operated means is initiated, means responsive to the existence of combustion at the burner for reducing the effective energization of said electromagnetic means below the value obtaining during the initial period of operation of said electrically operated means but not below the value required to hold said switch in closed position to maintain operation of said electrically operated means, and an electrically energizable time delay device connected in circuit with said electromagnetic means to be traversed at all times by the energizing current therefor and operative in response to continued initial energization of said electromagnetic means for a predetermined interval of time to stop the operation of said electrically operated means, but operatively deenergized upon said reduction of the effective energization of said electromagnetic means.

16. In a fuel burner control system, in combination, a source of electrical supply, electrically operated means for supplying fuel to the burner, a switch biased to open position and controlling the connection of said electrically operated means to said source, electromagnetic means for controlling the operation of said switch, a main control for effecting energization of a portion of said electromagnetic means to cause said switch to be closed, another portion of said electromagnetic means being energized upon closure of said switch, an electrically energizable time delay device connected in series circuit with said first-mentioned portion of said electromagnetic means but not with said electrically operated means and operative in response to continued current flow through said series circuit for a predetermined interval of time to stop the operation of said electrically operated means, and means responsive to the existence of combustion at the burner for interrupting said series circuit through said time delay device and said first-mentioned portion of said electromagnetic means, while sufficient energization of said electromagnetic means is maintained to hold said switch in closed position whereby operation of said electrically operated means is maintained.

17. In a fuel burner control system, in combination, a source of electrical supply, electrically operated means for supplying fuel to the burner, a switch biased to open position and controlling the connection of said electrically operated means to said source, electromagnetic means for controlling the operation of said switch and comprising two coils connected in parallel circuit branches, a main control for effecting energization of one of said coils to cause said switch to be closed, the other of said coils being maintained energized after closure of said switch to maintain said switch in closed position, said other coil being incapable of initially closing said switch, a time delay device comprising an electrically energizable element connected in series circuit with both of said coils to be traversed at all times by the energizing current therefor and operative in response to continued energization of said first-mentioned coil for a predetermined interval of time to stop the operation of said electrically operated means, and means responsive to the existence of combustion at the burner for operatively deenergizing said first-mentioned coil and said electrically energizable element of said time delay device.

18. In an automatic switching system, in combination, a switch biased to open position, electromagnetic means for controlling the operation of said switch, a main control for effecting initial energization of said electromagnetic means to actuate said switch from open position to closed position, means for reducing the effective energization of said electromagnetic means below the value obtaining during the initial period of closure of said switch but not below the value required to hold said switch in closed position, and an electrically energizable time delay device connected in circuit with said electromagnetic means to be traversed at all times by the energizing current therefor and operative in response to continued initial energization of said electromagnetic means for a predetermined interval of time to cause said switch to return to open position, but operatively deenergized upon said reduction of the effective energization of said electromagnetic means.

19. In an automatic switching system, in combination, a switch biased to open position, a main circuit controlled thereby, electromagnetic means for controlling the operation of said switch, a main control for effecting initial energization of a portion of said electromagnetic means to actuate said switch from open position to closed position, another portion of said electromagnetic means being energized upon closure of said switch, an electrically energizable time delay device connected in series circuit with said first-mentioned portion of said electromagnetic means but not with said main circuit and operative in response to continued current flow through said series circuit for a predetermined interval of time to cause said switch to return to open position, and means for interrupting said series circuit through said time delay device and said first-mentioned portion of said electromagnetic means, while sufficient energization of said electromagnetic means is maintained to prevent said switch from returning to open position.

20. In an automatic switching system, in combination, a switch biased to open position, electromagnetic means for controlling the operation of said switch and comprising two coils connected in parallel circuit branches, a main control for effecting energization of one of said coils to actuate said switch from open to closed position, means for maintaining energization of the other of said coils after closure of said switch to maintain said switch in closed position, said other coil being incapable of initially closing said switch, a time delay device comprising an electrically energizable element connected in series circuit with both of said coils to be traversed at all times by the energizing current therefor and operative in response to continued energization of said first-mentioned coil for a predetermined interval of time to cause said switch to return to open position, and means for operatively deenergizing said first-mentioned coil and said electrically energizable element of said time delay device.

In witness whereof we have hereunto subscribed our names.

JOHN C. BOGLE.
LAWRENCE E. KOCH.

CERTIFICATE OF CORRECTION.

Patent No. 1,908,494.  May 9, 1933.

JOHN C. BOGLE, ET AL.

It is hereby certified that error appears in the printed specification of the above numbered patent requiring correction as follows: Page 3, line 19, for "mercurv" read "mercury"; page 4, line 70, for "controled" read "controlled"; page 6, line 53, claim 6, after "shaft" second occurrence, insert a comma; page 7, line 73, claim 14, strike out the word "means"; and that the said Letters Patent should be read with these corrections therein that the same may conform to the record of the case in the Patent Office.

Signed and sealed this 8th day of August, A. D. 1933.

M. J. Moore.

(Seal)  Acting Commissioner of Patents.